United States Patent [19]

Sasamoto et al.

[11] Patent Number: 5,242,645
[45] Date of Patent: Sep. 7, 1993

[54] RUBBER-REINFORCING POLYESTER FIBER AND PROCESS FOR PREPARATION THEREOF

[75] Inventors: Tai Sasamoto, Marietta, Ga.; Takehiko Miyoshi, Mishima; Takuji Sato, Okazaki, both of Japan

[73] Assignee: Toray Industries, Inc., Japan

[21] Appl. No.: 721,545

[22] PCT Filed: Nov. 15, 1990

[86] PCT No.: PCT/JP90/01491
§ 371 Date: Sep. 13, 1991
§ 102(e) Date: Sep. 13, 1991

[87] PCT Pub. No.: WO91/07529
PCT Pub. Date: May 30, 1991

[30] Foreign Application Priority Data

Nov. 15, 1989 [JP] Japan .................. 1-296587
Dec. 13, 1989 [JP] Japan .................. 1-321343

[51] Int. Cl.$^5$ ............ D01D 10/02; D01F 6/16; D02J 1/22
[52] U.S. Cl. ............ 264/210.8; 264/211.12; 264/235.6; 528/283; 528/285; 528/308; 528/308.1; 528/308.6
[58] Field of Search ............ 264/210.8, 211.12, 235.6; 528/283, 285, 308, 308.1, 308.6

[56] References Cited

U.S. PATENT DOCUMENTS 3,895,090 7/1975 Kobayashi et al. ............ 264/211.12

FOREIGN PATENT DOCUMENTS 162313 11/1985 European Pat. Off. .
216109 4/1987 European Pat. Off. .
251313 1/1988 European Pat. Off. .
2164348 7/1972 Fed. Rep. of Germany .
2126218 8/1978 Fed. Rep. of Germany .
61-19812 1/1986 Japan .
61-132616 6/1986 Japan .
61-252332 11/1986 Japan .
62-69819 3/1987 Japan .
63-165547 7/1988 Japan .
1458585 12/1976 United Kingdom .

OTHER PUBLICATIONS

Abstract of Japan 61-19,812 (Published Jan., 1986).
Abstract of Japan 61-132,616 (Published Jun., 1986).
Abstract of Japan 61-252,332 (Published Nov. 1986).
Abstract of Japan 62-69,819 (Published Mar. 1987).
Abstract of Japan 63-165,547 (Published Jul. 1988).

Primary Examiner—Leo B. Tentoni
Attorney, Agent, or Firm—Austin R. Miller

[57] ABSTRACT

A rubber-reinforcing polyester fiber composed of a polyester prepared by using 30 to 150 ppm as antimony of an antimony compound and 5 to 60 ppm as germanium of a germanium compound as the polymerization catalyst. The fiber is characterized in that the terminal carboxyl group content is not larger than 25 eq/ton, diethylene glycol content (DEG) is not larger than 1.3% by weight, the intrinsic viscosity (IV) is at least 0.85, the sum (S) of the intermediate elongation and the dry heat shrinkage is lower than 8%, the product between strength and elongation (T$\sqrt{E}$) is at least (2S+5), and the terminal modulus (TM) is not higher than 40 g/d. The polyester fiber is used as a rubber reinforcement.

4 Claims, No Drawings

RUBBER-REINFORCING POLYESTER FIBER AND PROCESS FOR PREPARATION THEREOF

TECHNICAL FIELD

This invention relates to a rubber-reinforcing polyester fiber. More particularly, it relates to a polyester fiber used as a rubber reinforcement and having a good dimensional stability, a high strength, a high toughness, a high durability and a high heat resistance in a rubber, and capable of providing a tire having a good uniformity and a good durability.

BACKGROUND ART

A polyester fiber has good mechanical properties, dimensional stability and durability, and is widely used not only for clothing but also for industrial purposes. Especially, the amount of the polyester fiber used for reinforcing rubber materials, for example, as a tire cord, is increasing, because the above characteristics are effectively utilized.

A high-strength yarn obtained by drawing a low oriented undrawn yarn at a high ratio has been used for the production of a tire cord, but the dry heat shrinkage of this high-strength yarn is high, and if the high-strength yarn is embedded as the tire cord in a rubber and a tire is formed from the tire cord-embedded rubber, the uniformity of the tire becomes poor because of the shrinkage of the cord. To avoid this disadvantage, a method has been proposed in which a relatively highly oriented undrawn yarn (pre-oriented yarn, i.e., POY) is drawn to form a high-strength yarn, and the dimensional stability of the tire cord is improved by using this high-strength yarn. This method is currently widely used for the production of tire cords.

Recently, the tendency to use a polyester fiber even in the field where rayon is used as the automobile tire cord has become marked, and a good dimensional stability not previously attainable is now required for the polyester fiber. As the technique satisfying this requirement, a method is proposed in which the spinning speed of an undrawn pre-oriented yarn (POY) is increased to improve the dimensional stability, as disclosed in Japanese Unexamined Patent Publication No. 63-165547 or Japanese Unexamined Patent Publication No. 61-19812. Although a mere increase of the spinning speed of POY in the conventional method enhances the dimensional stability, the toughness is drastically degraded with an increase of the spinning speed of POY, and furthermore, since the heat resistance (IRT) in rubber is greatly lowered, the life of a tire formed by using the obtained yarn as the tire cord is short and the durability of the tire is poor. Accordingly, the above method is not practically used.

A low shrinkage tire cord based on a similar technical idea is proposed in Japanese Unexamined Patent Publication No. 61-132616, Japanese Unexamined Patent Publication No. 61-252332 or Japanese Unexamined Patent Publication No. 62-69819, but from the results of experiments made by the inventors, it has been confirmed that the heat resistance thereof in rubber is poor, as in the case of the tire cord disclosed in Japanese Unexamined Patent Publication No. 63-165547, and in practice, to moderate this defect as disclosed in the examples of the above patent publication, a blocking agent, i.e., an agent for reducing the terminal COOH content, such as 2,2'-bis(2-oxazoline), is used in the yarn-preparing process. If this blocking agent is used, however, such disadvantages as a degradation of the yarn-preparing property, increase of fluffs, lowering of the strength and of the fatigue resistance occur, and various problems must be solved to enable a practical working of the above-mentioned method.

DISCLOSURE OF THE INVENTION

An object of the present invention is to provide a high-strength rubber-reinforcing polyester fiber, especially a tire yarn, having a good dimensional stability, toughness and durability and capable of being used instead of a rayon fiber as a rubber reinforcement, and a process for the preparation thereof.

It has been found that this object can be attained by completely preventing a formation of particles in the polymer and controlling the orienting characteristics at the spinning step, from the aspect of the polymer characteristics, to keep the physical properties of a polyester fiber strictly within specific ranges.

More specifically, in one aspect of the present invention there is provided a rubber-reinforcing polyester fiber composed of a polyester prepared by using 30 to 150 ppm as antimony of an antimony compound and 5 to 60 ppm as germanium of a germanium compound, as the polymerization catalyst, wherein the terminal carboxyl group content ([COOH]) is not larger than 25 eq/ton, the diethylene glycol content (DEG) is not larger than 1.3% by weight, the intrinsic viscosity (IV) is at least 0.85, the sum (S) of the intermediate elongation and the dry heat shrinkage is lower than 8%, the product between strength and elongation ($T\sqrt{E}$) is at least $(2S+5)$, and the terminal modulus (TM) is not higher than 40 g/d.

In another aspect of the present invention, there is provided a process for the preparation of a rubber-reinforcing fiber, which comprises spinning at a high orientation a polyester prepared by using 30 to 150 ppm as antimony of an antimony compound and 5 to 60 ppm as germanium of a germanium compound, to obtain a highly oriented fiber having an intrinsic viscosity of at least 0.9 and a birefringence ($\Delta n$) of at least $80 \times 10^{-3}$, drawing the fiber at a draw ratio not larger than a draw ratio of 0.93 time the critical draw ratio, and heat-setting the drawn fiber at a temperature of at least 210° C.

BEST MODE OF CARRYING OUT THE INVENTION

In the present invention, the polyester used is a polyester comprising ethylene terephthalate units as the main recurring units. In view of the dimensional stability and strength, an addition or copolymerization of a third component other than diethylene glycol formed as a by-product is not preferable, and a polyethylene terephthalate substantially not containing inorganic particles or the like is preferably used.

In the polyester fiber of the present invention, the sum (S) of the internal elongation and the dry heat shrinkage, indicating the dimensional stability, must be lower than 8%. If S is 8% or higher, a polyester cord having a low shrinkage and a high modulus cannot be obtained, and the polyester cord cannot be used as a substitute for a rayon cord. From this viewpoint, S is preferably not larger than 7.5%.

The polyester fiber of the present invention must have a high toughness (i.e., a high strength-elongation product $T\sqrt{E}$), i.e., must satisfy the requirement of $T\sqrt{E} \geq (2S+5)$. If spinning is carried out at a high orientation to thereby reduce the dimensional sta-bility (S), the toughness (T$\sqrt{E}$) is also greatly reduced. The fatigue resistance of the tire cord is generally better when S is smaller, if a comparison is made based on the same toughness. As a result of investigations, it was found that the critical value of the toughness giving a satisfactory durability to the tire cord becomes smaller with a lowering of the dimensional stability (S). Namely, it was found that, in the region where the dimensional stability (S) is small, the durability is at a satisfactory level even if the toughness is relatively low. Accordingly, investigations were made with a view to clarifying this lower limit value of the toughness, and as a result it was found that, if the requirement of T$\sqrt{E} \geq (2S+5)$ is satisfied, a satisfactory durability (fatigue resistance) is attained as long as S is a small value such that will enable a substitution thereof for rayon. From this viewpoint, preferably a starting yarn satisfying the requirement of T$\sqrt{E} \geq (2S+8)$, more preferably satisfying the requirement of T$\sqrt{E} \geq (2S+11)$, is used.

Also the terminal carboxyl group content [COOH] of the polyester fiber of the present invention must be not larger than 25 eq/ton. If the [COOH] exceeds 25 eq/ton, the heat resistance in rubber is lowered and the durability of the tire cord becomes poor. Preferably, the [COOH] is not larger than 21 eq/ton.

Moreover, the diethylene glycol content (DEG) must be not larger than 1.3% by weight. If the DEG exceeds 1.3% by weight, the dimensional stability is lowered and the durability becomes poor. From this viewpoint, preferably the DEG is not larger than 1.1% by weight, more preferably not larger than 0.9% by weight.

The intrinsic viscosity (IV) of the polyester fiber must be at least 0.85. If the IV is lower than 0.85, the durability is poor, whatever conditions are adopted. From this viewpoint, the IV is preferably in the range of from 0.9 to 1.3.

Still further, the terminal modulus of the polyester fiber must not be higher than 40 g/d. If the terminal modulus is higher than 40 g/d, even if a starting yarn having a high toughness is obtained, the tenacity is lowered at the twisting step, and the toughness of the tire cord, and further, the durability, become poor. From this viewpoint, preferably, the terminal modulus is not higher than 30 g/d.

A high-toughness polyester fiber satisfying the requirement of T$\sqrt{E} \geq (2S+5)$, such as the polyester fiber of the present invention, cannot be obtained by the known high-speed spinning and drawing method.

As the result of investigations made with a view to improving the toughness in the region where the dimensional stability (S) is small, as in the present invention, it was found that, where crystallization with orientation is effected by a high-speed spinning, the behavior of the crystallization with orientation must be strictly controlled.

This control of the structure of POY has been mainly performed by controlling the cooling conditions, but as a result of detailed research it has been found that, by strictly controlling the composition of the catalyst used for the production of a polymer, the amount of particles in the polymer can be drastically reduced, and if the composition of the catalyst is appropriately selected, the modification of the polymer by controlling the orienting property and crystallinity of POY is effective. Namely, it has been found that a combined use of an antimony compound and a germanium compound, not heretofore adopted for a rubber-reinforcing polyester fiber as the catalyst, is remarkably effective.

More specifically, it has been found that use of 30 to 150 ppm as antimony of an antimony compound and 5 to 60 ppm as germanium of a germanium compound as the polymerization catalyst effectively attains the object of the present invention.

Antimony trioxide and antimony pentoxide are preferably used as the antimony compound, and germanium dioxide is preferably used as the germanium compound. If the amount of the antimony compound is smaller than 30 ppm, to maintain a polymerization reactivity, the germanium compound must be used in a large quantity, and therefore, the cost is increased and the amount of diethylene glycol increased, resulting in a lowering of the dimensional stability. If the amount of the antimony compound exceeds 150 ppm, even if the amount of the germanium compound to be used in combination is increased, a reduction of the amount of metallic antimony formed by a reduction of the antimony compound cannot be obtained, an improvement of the strength and toughness of the yarn cannot be realized, and the heat resistance thereof in rubber is lowered. If the amount of the germanium compound is smaller than 5 ppm, to maintain a polycondensation reactivity, the antimony compound must be used in an amount larger than 150 ppm. If the amount of the germanium compound exceeds 60 ppm, the cost is greatly increased, and thus the use of the polyester fiber becomes economically disadvantageous. Moreover, the amount of diethylene glycol is increased and the dimensional stability is lowered. In view of the foregoing, preferably the antimony compound is used in an amount of 40 to 120 ppm, more preferably 80 to 120 ppm, as the antimony, and preferably the germanium compound is used in an amount of 6 to 30 ppm as the germanium.

In the present invention, a combination catalyst comprising an antimony compound and a germanium compound must be used as the polymerization catalyst. Other combined polymerization catalysts comprising, for example, an antimony compound and a titanium or tin compound, cannot be used in the present invention because many particles are formed in the polymer, and thus the intended rubber-reinforcing polyester fiber of the present invention cannot be obtained.

A reduction of the number of defects in the yarn by controlling the composition of the catalyst content in the polymer in the above-mentioned manner is effective for improving the toughness and durability. This improvement is especially effectively attained by reducing the amount of metallic antimony precipitated by the reduction reaction of the antimony compound. Namely, the intended effect of the present invention is especially enhanced if the amount of metallic antimony in the fiber is made less than 5 ppm, preferably less than 3 ppm.

A process for preparing the polyester fiber of the present invention on an industrial scale will now be described.

A polycondensation reaction is carried out by using 30 to 150 ppm as antimony of an antimony compound and 5 to 60 ppm as germanium of a germanium compound as the polymerization catalyst. Preferably, phosphoric acid is used as the phosphorus compound, and phosphoric acid is added at the initial stage of the polycondensation before the addition of the antimony compound and germanium compound. By appropriately adjusting the charged amounts, the polymerization temperature and the polymerization time, a polyethylene terephthalate chip having an intrinsic viscosity (IV) of at least 0.65, a terminal carboxyl content ([COOH]) not higher than 25 eq/ton, and a diethylene glycol content (DEG) not higher than 1.3% by weight is obtained.

The obtained chip is subjected, if desired, to the solid phase polymerization according to customary procedures, whereby a polyethylene terephthalate chip having an IV of at least 1.0 is obtained.

The obtained chip is melt-spun according to customary procedures, and the spun filament is gradually cooled in a heating cylinder and taken up while being cooled and solidified by a chimney air current. Preferably, tubes in a spinning machine and packing parts are plated with chromium to control a precipitation of metallic antimony (reduction to metallic antimony). A metal wire (SUS) nonwoven fabric having an absolute filtering diameter not larger than 30 μm is preferably used as the filtration filter. Moreover, preferably the amount of dust in nitrogen used for the solid phase polymerization and nitrogen fed into the spinning machine is reduced to a level as low as possible, and air used for the chimney air current is filtered to reduce the amount of dust. According to this spinning process, the amount of foreign matter present in the formed yarn can be reduced to less than 800 per mg, preferably less than 500 per mg, whereby the toughness and durability can be advantageously improved.

The filament yarn extruded from the orifice is subjected to high-orientation spinning so that the birefringence ($\Delta n$) is at least $80 \times 10^{-3}$, preferably at least $95 \times 10^{-3}$. If POY having $\Delta n$ lower than $80 \times 10^{-3}$ is used, the dimensional stability of the obtained yarn is poor. This undrawn yarn (POY) is drawn by a hot roller after spinning or after the yarn is once wound, and the drawn yarn is heat-set at a temperature of at least 210° C. If the heat setting temperature is lower than 210° C., the dimensional stability is lowered. To reduce the terminal modulus and control the appearance of defects such as voids in the fiber, the drawing is preferably carried out at a draw ratio set at a level lower than the draw ratio of 0.93 time the draw ratio at break of the undrawn yarn.

The polyester fiber of the present invention can be obtained according to the above-mentioned process. To further improve the dimensional stability and toughness, the orientation and crystallization characteristics of POY must be controlled. As a result of investigations made with a view to finding a polymer composition effective for this control, it has been found that the kind, amount and addition method of the phosphorus compound are important factors.

In general, the phosphorus compound is used for improving the durability of a polymer. Surprisingly, however, it was found that the phosphorus compound added has an influence on the relationship between the dimensional stability and toughness of a fiber, and this is new knowledge found for the first time as the result of research made by the inventors.

Also as the result of research, it has been found that, if phosphoric acid is used as the phosphorus compound and phosphoric acid is added at the initial stage of the polycondensation in an amount of 10 to 40 ppm as phosphorus, especially good results can be obtained. By this control of the phosphorus compound, the toughness of the fiber can be increased to the same level as the dimensional stability. Namely, the requirements of $T\sqrt{E} \geq (2S + 5)$ can be satisfied.

The reason why this effect can be attained by such a controlled addition of the phosphorus compound has not been elucidated, but it is believed that, if a trifunctional phosphorus compound such as phosphoric acid is added in an appropriate amount at the initial stage of the polymerization, the formation of the fiber structure at the spinning step probably will be controlled by the viscosity-enhancing action of phosphoric acid.

EXAMPLES

The present invention will now be described in detail with reference to the following examples.

In the examples, the physical properties were determined according to the following methods.

A. The amounts of metals such as antimony and germanium, and of phosphorus in the polymer and fiber were determined by the X-ray fluorescence analysis.

B. Terminal carboxyl group content ([COOH]) was determined in the following manner.

In 10 ml of o-cresol was dissolved 0.5 g of the sample, and after the sample was completely dissolved, the solution was cooled and 3 ml of chloroform was added to the solution. Then, the terminal carboxyl group content was determined by potentiometric titration using a methanol solution of NaOH.

C. The DEG content was determined by alkali-decomposing the sample and measuring the amount of DEG by gas chromatography.

D. The strength-elongation, intermediate elongation and terminal modulus (TM) were determined in the following manner.

Using a Tensilon tensile tester (Tensilon UTL-4L) supplied by Toyo-Baldwin, a load-elongation curve was obtained at a sample length of 25 cm and a take-up speed of 30 cm/min, and the strength-elongation was determined from this curve.

From the same load-elongation curve, the elongation corresponding to the strength of 4.5 g/d was read as the intermediate elongation. The terminal modulus (TM) was determined by dividing the difference between the stress at the point of the elongation smaller by 2.4% than the elongation at break and the stress at break by $2.4 \times 10^{31\ 2}$.

E. The dry heat shrinkage $\Delta Sd$ was determined in the following manner.

The sample in the form of a hank was allowed to stand in an air-conditioned chamber maintained at a temperature of 20° C. and a relative humidity of 65% for more than 24 hours, a load corresponding to 0.1 g/d of the sample, was imposed on the sample, and the length $l_0$ of the sample was measured. Then, the sample was allowed to stand in an oven maintained at 150° C. under no tension for 15 minutes, and the sample was taken out from the oven and allowed to stand in the above-mentioned air-conditioned chamber for 4 hours. Then, the above-mentioned load was again imposed and the length $l_1$ was measured. The dry heat shrinkage $\Delta Sd$ was calculated according to the following formula:

$$\Delta Sd = [(l_0 - l_1)/l_0] \times 100 (\%)$$

F. The amount of foreign substances in the yarn was determined in the following manner.

The sample was divided into individual filaments and was spread on a slide glass so that the yarn was not slackened. The sample filament having a length of 6 cm was scanned by the phase contrast method using an optical microscope supplied by Olympus Optical Co. at 200 magnifications, and the amount of foreign substances in the yarn was counted. The measurement was conducted five times (N=5) and the mean value X (per 6 cm) was determined, and the obtained value was converted to the number of foreign substances per mg.

G. The intrinsic viscosity (IV) was determined in the following manner.

At a temperature of 25° C., 0.8 g of the sample was dissolved in 10 ml of o-chlorophenol (hereinafter referred to as "OCP"), and the relative viscosity ($\eta r$) was determined by an Ostward viscometer according to the following formula, and the IV was calculated from $\eta r$ according to the following formula:

$$\eta r = \eta/\eta_0 = t \times d/t_0 \times d_0, \text{ and}$$

$$IV = 0.0242\eta r + 0.2634$$

wherein $\eta$ represents the viscosity of the polymer solution, $\eta_0$ represents the viscosity of the solvent, t represents the falling time (seconds) of the solution, d represents the density (g/cm$^3$) of the solution, $t_0$ represents the falling time (seconds) of OCP, and $d_0$ represents the density (g/cm$^3$) of OCP.

H. The amount of metallic antimony was determined according to the following method.

In 500 ml of orthochlorophenol (OCP) was dissolved 40 g of the polymer, and the solution was subjected to centrifugal separation at 12,000 rpm for 2 hours. The separated solids were washed and dried. The spectrum of the centrifugally separated particles was measured by an X-ray diffractometrical apparatus and the amount of metallic antimony was determined from the spectrum.

I. The heat resistance in rubber (IRT) was evaluated in the following manner.

A dip cord was embedded in a rubber, and the tenacity after the curing treatment at 150° C. for 20 minutes and the tenacity after the curing treatment at 150° C. for 6 hours were measured. The IRT was evaluated based on the ratio between the measured tenacities.

J. The fatigue resistance (GY fative-life) was determined in the following manner.

According to ASTM D-885, the burst time of a tube was determined under an inner tube pressure of 3.5 kg/cm$^2$ at a rotation speed of 850 rpm and a tube angle of 90°. The fatigue resistance was evaluated according to the following standard.

A: increased by 10 to 30% compared with the burst time of the conventional tire cord (1000-240-703M supplied by Toray Industries Inc.)

B: increased by 0 to 10% compared with the burst time of the conventional tire cord C: shorter than the burst time of the conventional tire cord

EXAMPLE 1

To 100 parts of dimethyl terephthalate and 50.2 parts of ethylene glycol was added 0.035 part of manganese acetate tetrahydrate, and an ester interchange reaction was carried out according to customary procedures. Then, 0.0091 part (29 ppm as phosphorus) of phosphoric acid was added to the obtained product, 0.0025 part (17 ppm as germanium) of germanium dioxide was added, and 0.0125 part (104 ppm as antimony) of antimony trioxide was further added. A polycondensation reaction was carried out for 3 hours and 10 minutes at a temperature of 285° C.

The obtained polymer had an intrinsic viscosity (IV) of 0.72, a terminal carboxyl group content [(COOH)] of 17.1 eq/ton and a DEG content of 0.7% by weight.

The antimony content in the polymer was 100 ppm, the germanium content was 10 ppm, and the phosphorus content was 20 ppm. The amount of metallic antimony in the polymer was 0.3 ppm.

The obtained polymer was first dried at 160° C. for 5 hours and then subjected to solid phase polymerization at 225° C. to obtain a solid phase-polymerized chip having an IV of 1.35. The chip was spun at a spinning temperature of 295° C. by an extruder type spinning machine. A metal nonwoven fabric having an absolute filtration diameter of 15 $\mu$m was used as the filter, and a spinneret having round orifices having a diameter of 0.6 mm was used. Polymer-contacting portions of polymer tubes and packing parts were plated with chromium. Nitrogen to be filled into a hopper and a chimney was used after filtration through a 1 $\mu$m-filter. The filament yarn as extruded from the orifice was gradually cooled in a heating cylinder having a length of 25 cm and an inner diameter of 25 cm and maintained at 300° C., and was then cooled by a cooling chimney air current to be thereby solidified. The filament yarn was oiled and taken up at a take-up speed shown in Table 1. The obtained undrawn yarn was drawn at a drawing temperature of 90° C. and a heat treatment temperature of 240° C., while changing the draw ratio and relax ratio, to obtain a drawn yarn. In runs 1 through 3, the draw ratio was set at a level of 0.88 to 0.92 time the critical draw ratio, and in run 4, the draw ratio was set at a level of 0.95 time the critical draw ratio.

The amount of foreign substances in the obtained polyester fiber was 150 to 450 per mg. The IV was 0.98 to 1.01, the terminal carboxyl group content was 14 eq/ton, and the DEG content was 0.7% by weight. First twists of 49 T/10 cm were given to the drawn yarn in the S direction and final twists of 49 T/10 cm were then given in the Z direction to obtain a green cord.

Then, the cord was dip-treated with an adhesive by the two-bath method using a Computreater supplied by C. A. Litzler Inc., to obtain a treated cord.

The physical properties of the starting yarn and treated cord are shown in Table 1.

TABLE 1

| | Yarn-making conditions | | Starting yarn | | | | | | |
|---|---|---|---|---|---|---|---|---|---|
| | | | | | | | Intermediate | | |
| Run No. | Take-up speed (m/min) | Birefringence $\Delta n$ of POY ($\times 10^{-3}$) | Strength (g/d) | Elongation (%) | Intermediate elongation (%) | Dry heat shrinkage (%) | elongation + dry heat shrinkage (%) | $T\sqrt{E}$ (g/d) (%)$^{\frac{1}{2}}$ | Terminal modulus (g/d) |
| 1* | 2500 | 54.3 | 8.98 | 13.0 | 6.6 | 2.3 | 8.9 | 32.4 | 29.7 |
| 2 | 3500 | 87.0 | 8.15 | 13.5 | 6.3 | 1.1 | 7.4 | 29.9 | 24.0 |
| 3 | 4500 | 98.0 | 7.65 | 13.8 | 6.3 | 0.8 | 7.1 | 28.4 | 15.0 |
| 4* | 3500 | 87.0 | 8.70 | 10.5 | 5.7 | 1.9 | 7.6 | 28.2 | 48.4 |

TABLE 1-continued

|  | | Treated cord | | | |
| --- | --- | --- | --- | --- | --- |
| Run No. | Green cord Strength (g/d) | Strength (g/d) | Heat resistance (IRT) | Fatigue resistance | Intermediate elongation + dry heat shrinkage (%) |
| 1* | 7.34 | 7.25 | 70.1 | A | 6.7 |
| 2 | 6.74 | 6.61 | 64.9 | A | 6.4 |
| 3 | 6.07 | 6.26 | 57.1 | A | 5.9 |
| 4* | 6.31 | 5.90 | 60.1 | C | 6.9 |

*Comparative runs

As apparent from the results shown in Table 1, in run 1 wherein the birefringence Δn of the undrawn yarn was lower than $80 \times 10^{-3}$, the starting yarn had a dimensional stability (intermediate elongation + dry shrinkage) exceeding 8% and the tire performance (substitutability for rayon) was not satisfactory. In run 4 wherein the yarn-making conditions were the same as in run 2 but the draw ratio was higher than the level of 0.93 time the critical draw ratio, the terminal modulus of the starting yarn exceeded 40 g/d. Accordingly, the strength of the starting yarn was high but the strength retention ratio thereof was low, and thus the strength of the dip cord was lowered and the fatigue resistance thereof was not satisfactory. In runs 2 and 3 where the Δn of POY was at least $80 \times 10^{-3}$, the dimensional stability (intermediate elongation + dry shrinkage) was lower than 8%, the strength-elongation product requirement of $T\sqrt{E} \geq (2S+5)$ was satisfied and the terminal modulus was lower than 40 g/d, and thus a cord having good tire performances, fatigue resistance and heat resistance was obtained.

EXAMPLE 2

To 100 parts of dimethyl terephthalate and 50.2 parts of ethylene glycol was added 0.035 part of manganese acetate tetrahydrate, and ester interchange reaction was carried out according to customary procedures. Then, 0.0091 part of phosphoric acid was added to the obtained product, and 0.0030 part of germanium dioxide and 0.0100 part of antimony trioxide were further added. The polycondensation reaction was carried out at a temperature of 285° C.

The obtained polymer had an intrinsic viscosity of 0.705, a terminal COOH content of 17.5 eq/ton, and a DEG content of 0.85% by weight. In the polymer, the antimony content was 80 ppm, the germanium content was 17 ppm, and the phosphorus content was 21 ppm.

The polymer was first dried at 160° C. for 5 hours, and then a solid phase polymerization was carried out at 225° C., and thus solid phase-polymerized chips having different intrinsic viscosities IV were obtained. The chips were spun by an extruder type spinning machine at various spinning temperatures and residence times, to obtain filament yarns having different terminal COOH contents. The filament yarns as extruded from spinneret orifices having a diameter of 0.6 mm were gradually cooled in a heating cylinder having a length of 300 mm and maintained at 350° C., and cold air maintained at 18° C. was caused to impinge against the yarns to effect a cooling and solidification. Then, the yarns were taken up at a take-up speed shown in Table 2.

The obtained undrawn yarn was drawn at a drawing temperature of 85° C. and a heat treatment temperature of 240° C., at various draw ratios and relax ratios, to obtain drawn yarns shown in Table 2. First twists of 49 T/10 cm were given to each drawn yarn in the S direction and final twists of 49 T/10 cm were given in the Z direction to make a green cord. The green cord was dipped with an adhesive by using a Computreater supplied by C. A. Litzler, to obtain a treated cord. The treatment comprised a constant length treatment at 160° C. in a drying zone, a stretch treatment at 240° C. in a heat-treating zone, and a relax treatment at 240° C. in a post treatment zone. The intermediate elongation was controlled to 3 to 4% by adjusting the stretch ratio and relax ratio. The physical properties, heat resistance, and fatigue resistance of each of the treated cords are shown in Table 2.

As apparent from the data shown in Table 2, in the dip cord of run 5 wherein the dimensional stability of the starting yarn was higher than 8%, the uniformity of the tire was not satisfactory and the cord could not be used as a substitute for the rayon cord. Accordingly, the intended object of the present invention could not be attained. In the dip cord of run 10, since the $T\sqrt{E}$ of the starting yarn was smaller than (2S+5), the strength was lower than 5 g/d and the fatigue resistance was not satisfactory, and moreover, the heat resistance IRT in rubber was low and the durability was poor.

In the dip cord of run 11 wherein the intrinsic viscosity IV was lower than 0.9, since the terminal modulus of the starting yarn exceeded 40 g/d, the fatigue resistance was poor, and in the dip cord of run 13 wherein the COOH content was higher than 25 eq/ton, the heat resistance IRT in rubber was low, and thus the durability was poor. The object of the present invention was attained in the dip cords of runs 6, 7, 8, 9 and 12. The dip cords in runs 7, 8 and 9 wherein the dimensional stability was 4.5 to 6 provided tires having a good uniformity. The dip cord of run 8 wherein the COOH content was lower than 20 eq/ton exhibited a good heat resistance IRT in rubber over the dip cord of run 12 wherein the COOH content was higher than 20 eq/ton and the other conditions were the same as in run 8. The dip cords of runs 6 and 8 wherein the strength was at least 5.5 g/d had an excellent fatigue resistance.

TABLE 2

|  | Run No. | | | | | | | | |
| --- | --- | --- | --- | --- | --- | --- | --- | --- | --- |
|  | 5* | 6 | 7 | 8 | 9 | 10* | 11* | 12 | 13* |
| Yarn-making conditions | | | | | | | | | |
| IV of polymer | 1.25 | 1.25 | 1.25 | 1.25 | 1.25 | 1.25 | 0.95 | 1.30 | 1.30 |
| Heating cylinder | | | | | | | | | |
| Length (cm) | 30 | 30 | 30 | 30 | 30 | 30 | 30 | 30 | 30 |

TABLE 2-continued

| | Run No. | | | | | | | | |
|---|---|---|---|---|---|---|---|---|---|
| | 5* | 6 | 7 | 8 | 9 | 10* | 11* | 12 | 13* |
| Temperature (°C.) | 350 | 350 | 350 | 350 | 350 | 350 | 350 | 350 | 350 |
| Take-up speed (m/min) | 3000 | 3500 | 4000 | 4500 | 5000 | 7000 | 4500 | 4500 | 4500 |
| Birefringence Δn of POY ($\times 10^{-3}$) | 81.2 | 85.4 | 90.2 | 95.5 | 101.8 | 111.0 | 97.2 | 95.4 | 95.4 |
| Terminal COOH content ($\times 10^5$ eq/ton) | 16.4 | 17.2 | 15.0 | 16.2 | 16.5 | 17.0 | 14.0 | 21.2 | 26.4 |
| Starting yarn | | | | | | | | | |
| IV of yarn | 0.97 | 0.98 | 0.97 | 0.99 | 0.98 | 0.95 | 0.82 | 0.96 | 0.92 |
| Strength (g/d) | 8.6 | 8.2 | 7.9 | 7.5 | 6.3 | 5.0 | 7.4 | 7.6 | 7.4 |
| Elongation (%) | 14.6 | 13.5 | 14.0 | 14.2 | 12.8 | 11.5 | 13.9 | 13.6 | 14.0 |
| Intermediate elongation (%) | 6.5 | 6.5 | 6.5 | 7.0 | 6.3 | 6.3 | 7.1 | 7.0 | 7.1 |
| Dry heat shrinkage (%) | 1.9 | 1.4 | 1.2 | 0.7 | 0.4 | 0.2 | 0.9 | 0.8 | 0.8 |
| Intermediate elongation + dry heat shrinkage (%) | 8.4 | 7.9 | 7.7 | 7.7 | 6.7 | 6.5 | 8.0 | 7.8 | 7.9 |
| $T\sqrt{E}$ (g/d · $\sqrt{\%}$) | 32.9 | 30.1 | 29.6 | 28.3 | 22.5 | 17.0 | 27.6 | 28.0 | 27.7 |
| Terminal modulus (g/d) | 31.5 | 26.2 | 25.3 | 20.4 | 18.6 | 11.2 | 41.3 | 26.5 | 25.7 |
| Green cord | | | | | | | | | |
| Strength (g/d) | 6.89 | 6.76 | 6.60 | 6.31 | 5.35 | 4.74 | 6.70 | 6.50 | 6.65 |
| Treated cord | | | | | | | | | |
| Strength (g/d) | 6.75 | 6.62 | 6.45 | 6.26 | 5.33 | 4.60 | 6.40 | 6.15 | 6.21 |
| Intermediate elongation (%) | 3.7 | 3.8 | 3.5 | 3.3 | 3.2 | 3.2 | 3.5 | 3.3 | 3.4 |
| Dry heat shrinkage (%) | 3.3 | 2.7 | 2.4 | 2.3 | 1.5 | 0.6 | 1.7 | 2.3 | 2.2 |
| Intermediate elongation + dry heat shrinkage (%) | 7.0 | 6.5 | 5.9 | 6.6 | 4.7 | 2.9 | 5.2 | 5.6 | 5.6 |
| IRT (%) | 69.5 | 64.3 | 59.3 | 55.4 | 46.9 | 30.9 | 52.4 | 50.2 | 41.3 |
| Fatigue resistance | A | A | A | A | B | C | C | A | A |

*Comparative runs

EXAMPLE 3

Dip cords (treated cords) shown in Table 3 were made by carrying out the polymerization, yarn-making and post treatment in the same manner as described in run 8 of Example 2 except that the amounts of antimony trioxide and germanium dioxide to be used as the polymerization catalyst were changed. The physical properties of the starting yarns and the obtained dip cords (treated cords) are shown in Table 3.

As apparent from the data shown in Table 3, in the dip cords of runs 15 and 20 wherein the antimony (Sb) content exceeded 150 ppm and the dip cord of run 19 wherein the germanium (Ge) content exceeded 60 ppm, the heat resistance (IRT) in rubber was low and the durability was not satisfactory. In the dip cord of run 8 wherein the conditions were the same as in runs 15, 19 and 20, the IRT exceeded 55%, but in the dip cords of runs 15, 19 and 20, the IRT was lower than 46%. Therefore, it is understood that, if the antimony content or germanium content exceeds the limit specified in the present invention, the heat resistance in a rubber is drastically lowered. It also is understood that the strength of the dip cord is lowered with an increase of the antimony (Sb) content. In the dip cord of run 17 wherein the germanium (Ge) content was lower than 5 ppm, since the polycondensation time was long, the terminal COOH content exceeded 25 eq/ton and the heat resistance (IRT) in rubber was lowered. In the dip cords of runs 8, 14, 16 and 18 wherein the germanium content was 5 to 60 ppm and the antimony content was lower than 150 ppm, both the strength and the heat resistance (IRT) in rubber were good. Especially, in the dip cord of run 8 wherein the antimony content was 50 to 120 ppm and the germanium content was 7 to 20 ppm, the heat resistance in rubber was very high.

TABLE 3

| Run No. | Yarn-making conditions | | | | | Starting yarn | | | | |
|---|---|---|---|---|---|---|---|---|---|---|
| | IV of polymer | COOH content (eq/ton) | Sb content (ppm) | Ge content (ppm) | DEG content (%) | IV of yarn | Strength (g/d) | Elongation (%) | Intermediate elongation (%) | Dry heat shrinkage (%) | Intermediate elongation + dry heat shrinkage (%) |
| 8 | 1.25 | 16.2 | 80 | 17 | 0.85 | 0.98 | 7.5 | 14.2 | 7.0 | 0.7 | 7.7 |
| 14 | 1.25 | 16.3 | 130 | 16 | 0.82 | 0.99 | 7.4 | 14.5 | 6.9 | 0.8 | 7.7 |
| 15* | 1.25 | 16.0 | 160 | 17 | 0.83 | 0.98 | 7.1 | 14.3 | 6.8 | 0.7 | 7.5 |
| 16 | 1.25 | 21.2 | 40 | 17 | 0.83 | 0.98 | 7.5 | 14.1 | 6.9 | 0.8 | 7.7 |
| 17* | 1.25 | 26.2 | 80 | 3 | 0.85 | 0.97 | 7.5 | 14.3 | 6.9 | 0.7 | 7.6 |
| 18 | 1.25 | 16.4 | 80 | 30 | 0.85 | 0.96 | 7.4 | 14.6 | 7.0 | 0.7 | 7.7 |
| 19* | 1.25 | 17.0 | 80 | 70 | 0.84 | 0.95 | 7.5 | 14.7 | 7.0 | 0.9 | 7.9 |
| 20* | 1.25 | 15.2 | 230 | 0 | 0.83 | 0.97 | 6.8 | 13.9 | 6.9 | 0.8 | 7.7 |

| Run No. | Starting yarn | | Treated cord | | |
|---|---|---|---|---|---|
| | $T\sqrt{E}$ (g/d) (%)½ | Terminal modulus (g/d) | Strength (g/d) | Elongation (%) | IRT (%) |
| 8 | 28.3 | 20.4 | 6.3 | 5.6 | 55.4 |
| 14 | 28.2 | 21.4 | 6.1 | 5.7 | 49.2 |
| 15* | 26.8 | 20.8 | 5.9 | 5.6 | 43.0 |

TABLE 3-continued

| | | | | | |
|---|---|---|---|---|---|
| 16 | 28.1 | 20.9 | 6.3 | 5.8 | 49.0 |
| 17* | 28.4 | 21.0 | 6.3 | 5.8 | 42.0 |
| 18 | 28.3 | 21.0 | 6.3 | 5.7 | 52.1 |
| 19* | 28.8 | 21.2 | 6.3 | 5.7 | 45.4 |
| 20* | 25.4 | 21.5 | 5.5 | 5.6 | 40.1 |

*Comparative runs

INDUSTRIAL APPLICABILITY

The polyester fiber of the present invention has a high strength, dimensional stability, toughness and durability, and is useful as a rubber reinforcement, such as a tire reinforcement.

We claim:

1. A rubber-reinforcing polyester fiber composed of a polyester prepared by using 30 to 150 ppm as antimony of an antimony compound and 5 to 60 ppm as germanium of a germanium compound as the polymerization catalyst, wherein the terminal carboxyl group content ([COOH]) is not larger than 25 eq/ton, the diethylene glycol content (DEG) is not larger than 1.3% by weight, the intrinsic viscosity (IV) is at least 0.85, the sum (S) of the intermediate elongation and the dry heat shrinkage is lower than 8%, the product between strength and elongation ($T\sqrt{E}$) is at least ($2S+5$), and the terminal modulus (TM) is not higher than 40 g/d.

2. A rubber-reinforcing polyester fiber as set forth in claim 1, wherein the strength-elongation product ($T\sqrt{E}$) is at least ($2S+8$).

3. A rubber-reinforcing polyester fiber as set forth in claim 1, wherein the sum (S) of the intermediate elongation and the dry heat shrinkage is not larger than 7.5%.

4. A process for the preparation of a rubber-reinforcing fiber, which comprises spinning at a high orientation a polyester prepared by using 30 to 150 ppm as antimony of an antimony compound and 5 to 60 ppm as germanium of a germanium compound, to obtain a highly oriented fiber having an intrinsic viscosity of at least 0.9 and a birefringence ($\Delta n$) of at least $80 \times 10^{-3}$, drawing the fiber at a draw ratio not larger than the draw ratio of 0.93 times the critical draw ratio, and heat-setting the drawn fiber at a temperature of at least 210° C.

* * * * *